United States Patent
Kim et al.

(10) Patent No.: US 10,777,840 B2
(45) Date of Patent: Sep. 15, 2020

(54) APPARATUS FOR SEALING SECONDARY BATTERY

(71) Applicant: LG CHEM, LTD., Seoul (KR)

(72) Inventors: Sang Hun Kim, Daejeon (KR); Yong Su Choi, Daejeon (KR); Sang Suk Jung, Daejeon (KR); Won Pill Hwang, Daejeon (KR); Cho Long Kim, Daejeon (KR); Yong Kim, Daejeon (KR)

(73) Assignee: LG Chem, Ltd. (KR)

( * ) Notice: Subject to any disclaimer, the term of this patent is extended or adjusted under 35 U.S.C. 154(b) by 269 days.

(21) Appl. No.: 15/563,396

(22) PCT Filed: Aug. 26, 2016

(86) PCT No.: PCT/KR2016/009550
§ 371 (c)(1),
(2) Date: Sep. 29, 2017

(87) PCT Pub. No.: WO2017/034380
PCT Pub. Date: Mar. 2, 2017

(65) Prior Publication Data
US 2018/0090780 A1  Mar. 29, 2018

(30) Foreign Application Priority Data

Aug. 27, 2015 (KR) .................. 10-2015-0121184
Aug. 25, 2016 (KR) .................. 10-2016-0108595

(51) Int. Cl.
*B65B 5/04* (2006.01)
*H01M 10/04* (2006.01)
(Continued)

(52) U.S. Cl.
CPC .......... *H01M 10/0404* (2013.01); *B65B 5/04* (2013.01); *B65B 7/16* (2013.01); *B65B 51/10* (2013.01);
(Continued)

(58) Field of Classification Search
USPC ...................................... 53/375.3
See application file for complete search history.

(56) References Cited

U.S. PATENT DOCUMENTS 4,630,429 A * 12/1986 Christine ............... B29C 65/18
156/515
5,673,564 A * 10/1997 Fradin ................... A23B 4/064
426/524
(Continued)

FOREIGN PATENT DOCUMENTS

CN       1833325 A      9/2006
CN     102290536 A     12/2011
(Continued)

OTHER PUBLICATIONS

European Search Report for Appl. No. 16839668.7 dated Jan. 18, 2018.
(Continued)

*Primary Examiner* — Michelle Lopez
*Assistant Examiner* — Chinyere J Rushing-Tucker
(74) *Attorney, Agent, or Firm* — Lerner, David, Littenberg, Krumholz & Mentlik, LLP

(57) ABSTRACT

The present invention relates to an apparatus for sealing a secondary battery. The apparatus comprises: a sealing member thermally fusing and sealing a sealing surface of a pouch in which an electrode assembly is accommodated; and a cooling member cooling the sealing surface.

8 Claims, 5 Drawing Sheets

(51) Int. Cl.
*H01M 2/02* (2006.01)
*H01M 2/26* (2006.01)
*B65B 7/16* (2006.01)
*B65B 51/10* (2006.01)
*B65B 51/32* (2006.01)
*H01M 2/08* (2006.01)

(52) U.S. Cl.
CPC ........... *B65B 51/32* (2013.01); *H01M 2/0207* (2013.01); *H01M 2/0275* (2013.01); *H01M 2/0287* (2013.01); *H01M 2/08* (2013.01); *H01M 2/263* (2013.01)

(56) References Cited

U.S. PATENT DOCUMENTS

| | | | | |
|---|---|---|---|---|
| 5,775,065 | A * | 7/1998 | Tolson | B65B 61/06 53/372.3 |
| 8,539,740 | B2 * | 9/2013 | Tsuruta | B29C 65/18 53/375.3 |
| 2004/0139701 | A1 | 7/2004 | Cady et al. | |
| 2005/0150195 | A1 * | 7/2005 | Taylor, Sr. | B29C 65/18 53/512 |
| 2006/0194103 | A1 * | 8/2006 | Otohata | H01G 9/016 429/185 |
| 2011/0311862 | A1 | 12/2011 | Ahn | |
| 2013/0189570 | A1 * | 7/2013 | Park | H01M 2/021 429/185 |
| 2013/0244093 | A1 * | 9/2013 | Min | H01M 2/0287 429/185 |
| 2015/0000117 | A1 * | 1/2015 | Cho | H01M 10/0404 29/623.2 |
| 2015/0325822 | A1 * | 11/2015 | Ichikawa | H01M 2/0275 429/185 |
| 2015/0372263 | A1 * | 12/2015 | Douke | H01M 2/0275 429/176 |
| 2017/0120505 | A1 * | 5/2017 | Nakano | B23K 20/10 |
| 2018/0123091 | A1 | 5/2018 | Ichikawa et al. | |

FOREIGN PATENT DOCUMENTS

| | | |
|---|---|---|
| CN | 104393226 A | 3/2015 |
| CN | 104412407 A | 3/2015 |
| EP | 1 667 251 A1 | 6/2006 |
| JP | 58-21503 U | 2/1983 |
| JP | 1-320753 A | 12/1989 |
| JP | 2005-108633 A | 4/2005 |
| JP | 2006-004687 A | 1/2006 |
| JP | 2008-146942 A | 6/2006 |
| JP | 2009-242000 A | 10/2009 |
| KR | 10-2006-0033034 A | 4/2006 |
| KR | 10-0958649 B1 | 5/2010 |
| KR | 10-2012-0019127 A | 3/2012 |
| KR | 10-1471765 B1 | 12/2014 |
| KR | 10-1508529 B1 | 4/2015 |
| KR | 10-2016-0019259 A | 2/2016 |
| WO | WO 2013/191125 A1 | 12/2013 |

OTHER PUBLICATIONS

Office Action dated Nov. 26, 2018 in corresponding European Patent Application 16 839 668.7-1108.
International Search Report issued in PCT/KR2016/009550 (PCT/ISA/210), dated Dec. 6, 2016.
Chinese Search Report for Application No. CN 201680022215.0 dated Mar. 12, 2020, 2 pages.

* cited by examiner

APPARATUS FOR SEALING SECONDARY BATTERY

CROSS-REFERENCE TO RELATED APPLICATION

The present application claims the benefit of the priority of Korean Patent Application Nos. 10-2015-0121184, filed on Aug. 27, 2015, and 10-2016-0108595, filed on Aug. 25, 2016, which are hereby incorporated by reference in their entirety.

TECHNICAL FIELD

The present invention relates to an apparatus for sealing a secondary battery, and more particularly, to an apparatus for sealing a secondary battery, which prevents a resin layer provided inside a sealing surface from leaking to the outside of the sealing surface when the sealing surface of a pouch is thermally fused.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

The secondary battery according to the related art comprises an electrode assembly and a pouch accommodating the electrode assembly. The electrode assembly is provided with a positive electrode, a separator, and a negative electrode, and the pouch is provided with an accommodation part accommodating the electrode assembly and a sealing surface sealing a circumferential surface of the accommodation part.

Also, the pouch is provided with an internal resin layer, a metal layer, and an external resin layer. The internal and external resin layers protect the metal layer against the outside, and the metal layer enhance insulation.

However, in the secondary battery according to the related art, the sealing surface of the pouch is thermally fused in the state in which the electrode assembly is accommodated in the pouch. Here, there is a problem that the internal resin layer of the sealing surface is melted together to leak to the outside. Particularly, when the melted internal resin layer leaks to the accommodation part, there is a problem that the internal resin layer comes into contact with the electrode assembly to damage the electrode assembly.

To solve the abovementioned problems, the prevent invention provides an apparatus for sealing a secondary battery, which cools an internal resin layer provided on a sealing surface to prevent the internal resin layer from leaking to the pouch when the sealing surface of the pouch is thermally fused.

Technical Solution

To achieve the abovementioned object, an apparatus for sealing a secondary battery according to the present invention comprises: a sealing member thermally fusing and sealing a sealing surface of a pouch in which an electrode assembly is accommodated; and a cooling member cooling the sealing surface.

The sealing member may thermally fuse and seal top and bottom surfaces of the sealing surface at the same time.

The cooling member may cool top and bottom surface of the sealing surface at the same time.

The cooling member may be provided with an internal cooling part and an external cooling part, which respectively cool an inner end and an outer end of the sealing surface with the sealing member therebetween.

The internal cooling part and the external cooling part may have cooling temperatures different from each other.

The internal cooling part disposed on the inner end of the sealing surface may have a cooling temperature higher than that of external cooling part.

The internal cooling part and the external cooling part may have cooling areas different from each other.

The internal cooling part disposed on the inner end of the sealing surface may have a cooling area greater than that of the external cooling part.

The cooling member and the sealing member may be disposed without being closely attached to each other to secure an insulation and deformation space between the cooling member and the sealing member.

An insulation material may be provided between the cooling member and the sealing member.

Advantageous Effects

The present invention has effects as follows.

First: the sealing apparatus comprising the sealing member and the cooling member may be provided to thermally fuse and seal the sealing surface of the pouch and also cool the internal resin layer of the sealing surface and thereby to prevent the internal resin layer from leaking to the inside of the pouch, thereby preventing the internal resin layer and the electrode assembly from coming into contact with each other.

Second: the pair of sealing members may be provided to thermally fuse and seal both the sealing surfaces at the same time to enhance the sealing capability.

Third: the pair of cooling members may be provided to cool both the sealing surfaces at the same time, thereby significantly preventing the internal resin layer from being melted.

MODE FOR CARRYING OUT THE INVENTION

Figure 1:
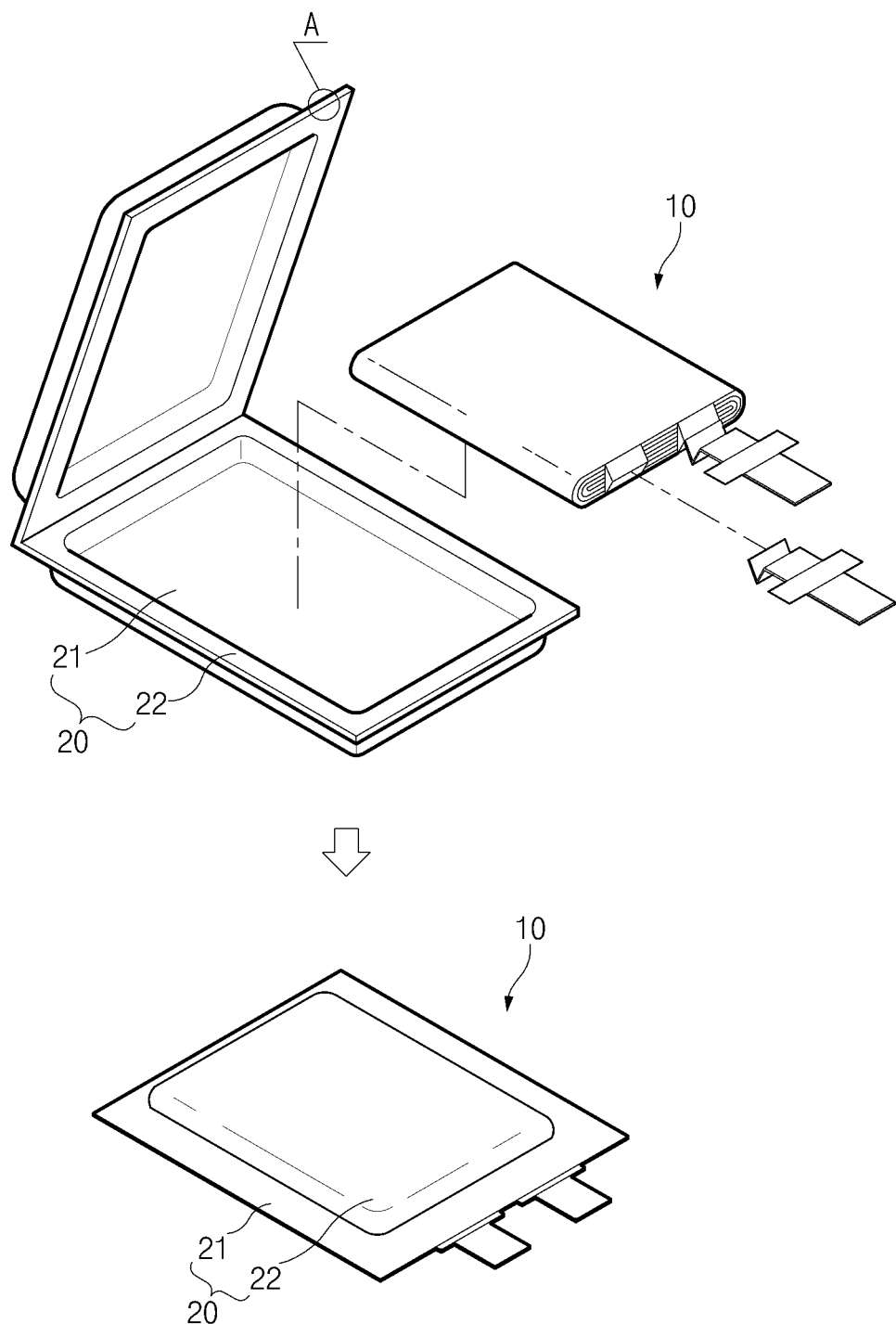
FIG. 1 is a view of an apparatus for sealing a secondary battery according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a secondary battery comprises an electrode assembly 10 and a pouch 20 provided with an upper case and a lower case, which are coupled to each other in a state of accommodating the electrode assembly 10 therebetween.

Also, the pouch 20 is provided with an accommodation part 21 accommodating the electrode assembly 10 by coupling the upper case to the lower case and a sealing surface 22 disposed on an edge surface of the accommodation part 21 and thermally fused and sealed.

Also, the pouch 20 has a structure in which an internal resin layer 20a, a metal layer 20b, and an external resin layer 20c are laminated to secure insulation and safety.

Figure 2:
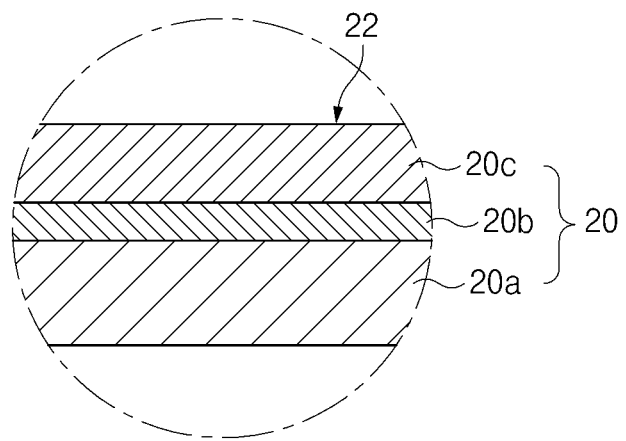
FIG. 2 is an enlarged view of a portion A of FIG. 1.

As illustrated in FIG. 2, in the secondary battery, the sealing surface 22 is thermally fused and sealed in the state in which the electrode assembly 100 is accommodated in the accommodation part 21 of the pouch 20. Here, the apparatus 100 for sealing the secondary battery according to the present invention is used.

As illustrated in FIG. 2, the apparatus 100 for sealing the secondary battery comprises a sealing member 110 for thermally fusing and sealing the sealing surface 22 of the pouch 20 in which the electrode assembly 10 is accommodated.

That is, in the apparatus 100 for sealing the secondary battery according to the present invention, the sealing surface 22 of the pouch 20 may be thermally fused and sealed, while being pressed, by using the sealing member 110 that is heated at a high temperature.

Here, the sealing member 110 is provided in a pair to thermally fuse the sealing surfaces 22 while pressing top and bottom surfaces of the sealing surface 22 at the same time, thereby enhancing sealing capacity of the sealing surfaces 22.

In the apparatus 100 for sealing the secondary battery, when the sealing surface 22 is thermally fused by using the sealing member 110, there is a problem that the internal resin layer 20a inside the sealing surface 22 is melted by a heating source of the sealing member 110, and thus, the melted internal resin layer 20a flows and leaks to the outside of the sealing surface 22. Particularly, when the internal resin layer 20a leaks to the accommodation part 21, the internal resin layer 20a and the electrode assembly may come into contact with each other to damage the electrode assembly 10.

Figure 3:
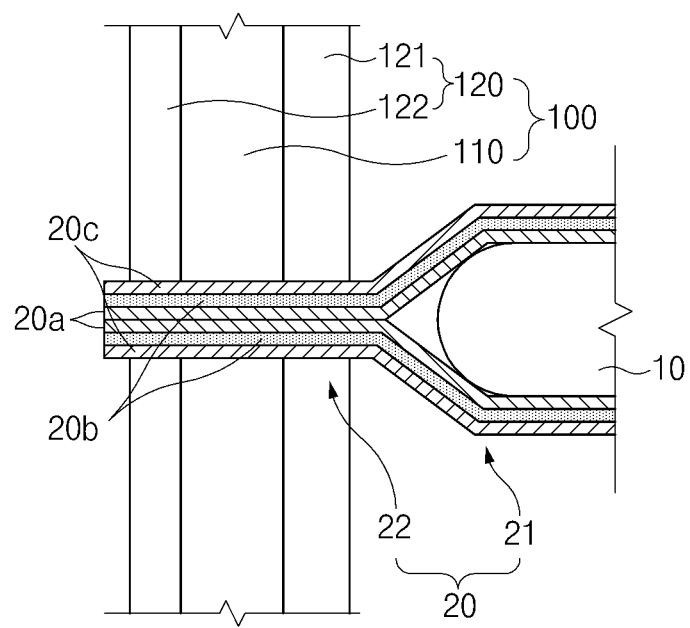
FIG. 3 is an enlarged cross-sectional view of the apparatus for sealing the secondary battery according to the present invention.

To solve the above-described problem, the apparatus 100 for sealing the secondary battery according to the present invention comprises a cooling member 120 cooling the internal resin layer 20a melted by the sealing member 110 to prevent the internal resin layer 20a from flowing and leaking to the outside of the sealing surface 22. That is, the cooling member 120 cools each of an inner end (a right end of the sealing surface when viewed in FIG. 3) and an outer end (a left end of the sealing surface when viewed in FIG. 3) of the sealing surface 22.

In more detail, the cooling member 120 is provided with an internal cooling part 121 and an external cooling part 122, which respectively cool the inner end and the outer end of the sealing surface 22 with the sealing member 110 therebetween. That is, the sealing member 110 melts the internal resin layer 20a inside the sealing surface 22 to seal the sealing surface 22, and the internal cooling part 121 and the external cooling part 122 respectively cool the inner end and the outer end of the sealing surface 22 to prevent the melted internal resin layer 20a from leaking to the inner end and the outer end of the sealing surface 22. Particularly, the cooling member 120 may prevent the melted internal resin layer 20a from leaking all of an external direction of the sealing surface 22 and a direction of the accommodation part.

Here, the cooling member 120 may be provided in a pair to cool the top and bottom surfaces of the sealing surface 22 at the same time, thereby more effectively cooling the sealing surface 22.

The internal cooling part 121 and the external cooling part 122 of the cooling member 120 have cooling temperatures different from each other. That is, the inner end and the outer end of the sealing surface 22 may have thicknesses different from each other. Thus, the internal cooling part 121 and the external cooling part 122 are differently adjusted in cooling temperature due to the difference in thickness of the inner end and the outer end to more effectively cool the internal resin layer 20a inside the sealing surface 22.

As a first example, the internal cooling part 121 provided on the inner end of the sealing surface 22 may have a cooling temperature higher than that of the external cooling part 122 provided on the outer end of the sealing surface 22 to more effectively cool the internal resin layer 20a disposed on the inner end of the sealing surface 22, thereby preventing the internal resin layer 20a from leaking in the direction of the accommodation part.

As a second example, the sealing surface 22 has a shape that gradually decreases in thickness from the inner end to the outer end. Thus, the cooling temperature of the internal cooling part 121 cooling the inner end of the sealing surface 22 may be set higher than that of the external cooling part 122 to improve cooling efficiency.

Figure 4:
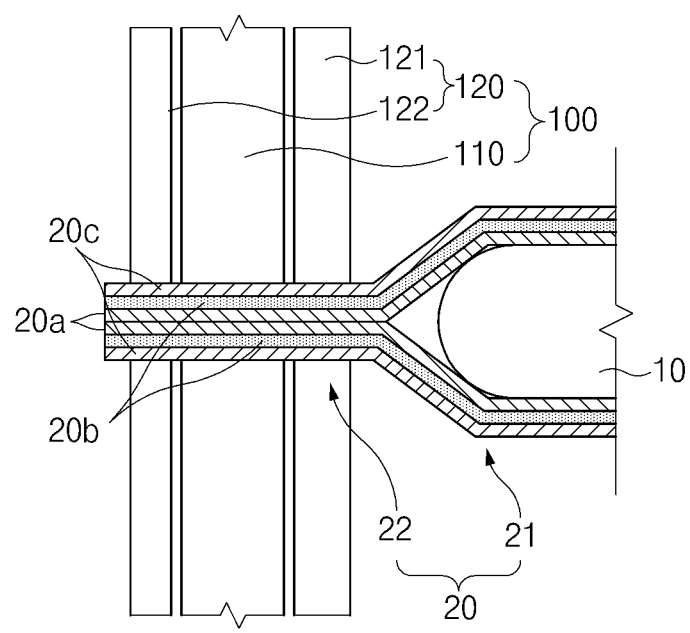
FIG. 4 is a cross-sectional view of a sealing apparatus according to another embodiment of the present invention.

The internal cooling part 121 provided on the inner end of the sealing surface 22 has a cooling area greater than that of the external cooling part 122. That is, when the internal resin layer 20a leaks to the inner end of the sealing surface 22, the electrode assembly may be damaged. Thus, the internal cooling part 121 may have the cooling area greater than that of the external cooling part 122 to effectively cool the internal resin layer 20a disposed on the inner end of the sealing surface 22, thereby preventing the internal resin layer 20a from leaking in the direction of the accommodation part. As illustrated in FIG. 4, the cooling member 120 and the sealing member 110 are disposed without being closely attached to each other to secure an insulation and deformation space between the cooling member 120 and the sealing member 110. That is, exchange of heat or cool air between the cooling member and the sealing member 110 may be prevented by the insulation and deformation space. For example, although the high temperature of the sealing member 110 is transferred to the cooling member 120 to rise the cooling temperature, the heat transfer may be blocked through the insulation and deformation space to prevent the cooling temperature from decreasing.

Particularly, the sealing surface 22 comprising the melted internal resin layer 20a is pushed out to the insulation and deformation space between the sealing member 110 and the cooling member 120 to significantly prevent the internal resin layer 20a from leaking to the outside.

Figure 5:
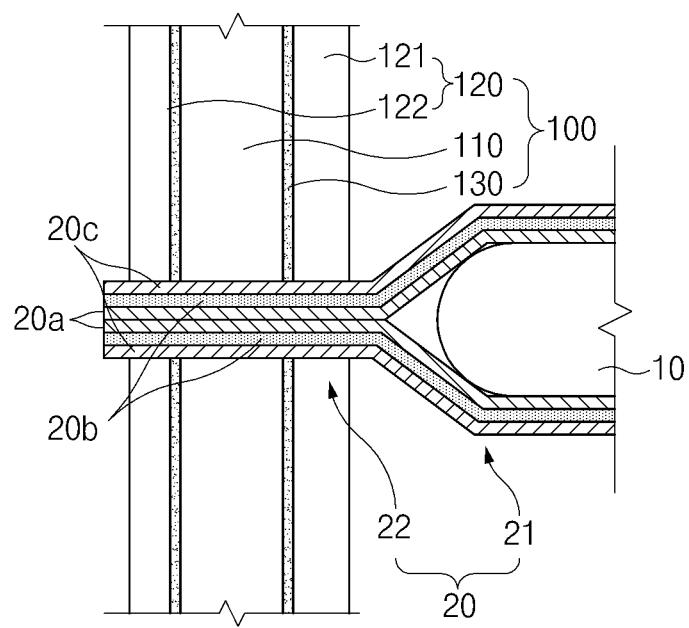
FIG. 5 is a cross-sectional view of a sealing apparatus according to further another embodiment of the present invention.

As illustrated in FIG. 5, an insulation material 130 may be provided in the insulation and deformation space between the cooling member 120 and the sealing member 110. The insulation material 130 may effectively block the exchange of the heat or cool air between the cooling member and the sealing member 100. In the apparatus 100 for sealing the secondary battery, which comprises the above-described constituents, according to the present invention, the sealing apparatus 100 may prevent the melted internal resin layer 20a inside the sealing surface 22 from leaking although the sealing surface 22 of the pouch is thermal fused. Thus, the internal resin layer 20a and the electrode assembly 10 may be prevented from coming into contact with each other to prevent the electrode assembly 10 from being damaged.

That is, in the apparatus 100 for sealing the secondary battery according to the present invention, when the sealing process is performed, the sealing member 110 may seal the pouch, and simultaneously, the cooling member 120 comprising the internal cooling part 121 and the external cooling part 122 may cool both the ends of the sealing surface. Thus, since the resins of both the ends of the sealing member 110 are cooled and solidified, the central resins may be prevented from flowing to the outside even though the resins are melted.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus for sealing a secondary battery, the apparatus comprising:
a sealing member thermally fusing and sealing a sealing surface of a pouch in which an electrode assembly is accommodated; and
a cooling member cooling the sealing surface,
wherein the cooling member is configured to abut and conductively cool an inner end of the sealing surface, an outer end of the sealing surface, or both, to prevent an internal resin layer of the sealing surface from flowing to an accommodation part of the pouch and to an external direction of the sealing surface,
wherein the cooling member is provided with an internal cooling part and an external cooling part, which respectively cool the inner end and the outer end of the sealing surface with the sealing member therebetween, and
wherein the internal cooling part and the external cooling part have cooling temperatures different from each other.

2. The apparatus of claim 1, wherein the sealing member thermally fuses and seals top and bottom surfaces of the sealing surface at the same time.

3. The apparatus of claim 1, wherein the cooling member cools top and bottom surface of the sealing surface at the same time.

4. The apparatus of claim 1, wherein the internal cooling part disposed on the inner end of the sealing surface has a cooling temperature higher than that of external cooling part.

5. The apparatus of claim 1, wherein the cooling member and the sealing member are disposed without being closely attached to each other to secure an insulation and deformation space between the cooling member and the sealing member.

6. The apparatus of claim 1, wherein an insulation material is provided between the cooling member and the sealing member.

7. An apparatus for sealing a secondary battery, the apparatus comprising:
a sealing member thermally fusing and sealing a sealing surface of a pouch in which an electrode assembly is accommodated; and
a cooling member cooling the sealing surface,
wherein the cooling member is configured to abut and conductively cool an inner end of the sealing surface, an outer end of the sealing surface, or both, to prevent an internal resin layer of the sealing surface from flowing to an accommodation part of the pouch and to an external direction of the sealing surface,
wherein the cooling member is provided with an internal cooling part and an external cooling part, which respectively cool the inner end and the outer end of the sealing surface with the sealing member therebetween, and
wherein the internal cooling part and the external cooling part have cooling surfaces having contact areas having different sizes from each other, the contact areas being configured to contact the sealing surface of the pouch,
wherein the internal cooling part and the external cooling part have cooling temperatures different from each other.

8. The apparatus of claim 7, wherein the cooling surface of the internal cooling part disposed on the inner end of the sealing surface has a cooling contact area having a size that is greater than that of the external part.

* * * * *